(12) United States Patent
Chudukatil et al.

(10) Patent No.: US 7,707,549 B2
(45) Date of Patent: Apr. 27, 2010

(54) SYNCHRONICITY IN SOFTWARE DEVELOPMENT

(75) Inventors: Ranjit Rudra Varkey Chudukatil, Redmond, WA (US); Daniel H. Winn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 11/375,781

(22) Filed: Mar. 15, 2006

(65) Prior Publication Data

US 2007/0220497 A1    Sep. 20, 2007

(51) Int. Cl.
*G06F 9/44* (2006.01)

(52) U.S. Cl. .................... 717/120; 717/101; 707/1; 707/100; 707/200

(58) Field of Classification Search .......... 707/100, 707/200; 715/210, 225; 717/110, 120, 108, 717/101
See application file for complete search history.

(56) References Cited

U.S. PATENT DOCUMENTS

| 5,287,488 | A * | 2/1994 | Sakata et al. ............... 703/22 |
| 6,208,990 | B1 * | 3/2001 | Suresh et al. ............... 707/6 |
| 6,257,774 | B1 * | 7/2001 | Stack ........................ 717/110 |
| 6,405,189 | B1 * | 6/2002 | Gillis ......................... 707/3 |
| 6,715,130 | B1 * | 3/2004 | Eiche et al. ............... 715/210 |
| 7,383,269 | B2 * | 6/2008 | Swaminathan et al. ...... 707/101 |
| 2002/0046394 | A1 * | 4/2002 | Do et al. .................... 717/108 |
| 2002/0059280 | A1 * | 5/2002 | Slesinsky .................. 707/100 |
| 2004/0216045 | A1 * | 10/2004 | Martin et al. ............... 715/530 |
| 2004/0230563 | A1 * | 11/2004 | Mahon et al. ............... 707/1 |
| 2005/0097109 | A1 * | 5/2005 | Bitsch ....................... 707/100 |
| 2006/0112100 | A1 * | 5/2006 | Maeda et al. .............. 707/8 |
| 2006/0253478 | A1 * | 11/2006 | Graham et al. ............. 707/100 |
| 2007/0143744 | A1 * | 6/2007 | Clemm et al. ............. 717/128 |
| 2007/0162316 | A1 * | 7/2007 | Kratschmer et al. ........ 705/8 |

OTHER PUBLICATIONS

Borland Software Corporation, Borland CaliberRM 2005, (Borland.pdf), # of pp. 2.*
IBM, Requirements management practices for developers, Jul. 15, 2002, (IBM.pdf), # of pp. 11.*
Rational Software Corporation, Rational RequisitePro, 2003, (Rational_Req.pdf), # of pp. 334.*
Cusumano et al. (Frequent_Synchronzation.pdf), "How Microsoft Builds Software", Jun. 1997, (total pp. 9).*

* cited by examiner

*Primary Examiner*—Wei Y Zhen
*Assistant Examiner*—Hiren Patel
(74) *Attorney, Agent, or Firm*—Workman Nydegger

(57) ABSTRACT

Systems and methods that facilitate software development projects via employing a synchronization component, which enables synchronization among a state for a specification, a product and an associated documentation. A project manager responsible for preparing the specification can enter and/or store the definition of the specification in a specification database, in form of a Structured Query Language (SQL), for example. A differentiator component compares state of the specification with the product (e.g., build of SQL server) at desired intervals, and further identifies any discrepancies therebetween. As such, a centralized location is provided for comparison of the specification and the product, and for enabling synchronization among the specification, the product and the associated documentation.

10 Claims, 10 Drawing Sheets

Transaction Name: Sys.dm_tran_active_transactions

| Column Name | Data Type | Description |
|---|---|---|
| transaction_id | begit | ID of the transaction at the instance level. |
| name | nvarchar(64) | Transaction name. |
| transaction_begin_time | datetime | Time that transaction started. |
| transaction_type | int | 1= Read/Write 2= Read-only |
| transaction_uow | uniqueidentifier | uses the UOW identifier |
| transaction_state | uniqueidentifier | uses the UOW identifier |
| transaction_status | int | For internal use only |
| transaction_status2 | int | For internal use only |
| dtc_state | int | 1= Active 2=Prepared 3= Committed |
| dtc_status | int | For internal use only |
| dtc_isolation_level | int | For internal use only |

Fig. 3

SYNCHRONICITY IN SOFTWARE DEVELOPMENT

BACKGROUND

Rapid development of information and communication systems in recent years has increased demand for quality improvement of software products and for efficiency in software development. As more efforts are directed to meeting such demands, employing software-design aid devices is increasing. In general, advantages for use of software-design aiding devices include facilitating standardization through an exclusion of individuality by providing standard formats, template figure components, and the like.

Moreover, effective management is an important objective for project managers, wherein choosing an appropriate development lifecycle process for the software project becomes crucial. For example, all other activities in software development can be derived from such lifecycle process. At the same time, continuously changing design or specification requirements of the development cycle poses difficulties and major problems. A great number of software applications fail to meet user requirements, and hence result in unacceptable maintenance costs, due to such changes.

Typically, for modern software development projects, gathering and agreeing on design requirements is fundamental to a successful project. Such does not necessarily imply that all requirements need to be fixed before any architecture, design, and coding is done—yet it is important for the development team to understand what needs to be built. Accordingly, clear communications between various team members become essential for the development team to realize the desired outcome, and proper basis for the specifications and requirements.

The cyclical interaction among team members for developing a computer software product can become a complex process that requires significant expenditure of time on part of various contributing teams. For example, software products are increasingly being developed by a plurality of teams working concurrently, and these teams are often distributed between different locations and organizations. Such teams can include project management, software development team (developer), and documentation team that work concurrently on the design of a product. In practice, the division of tasks and activities is carried out by generating documents/items that need to be timely shared among the various team members at various stages of software development.

Such items can include a specification, a product and associated documentation and help files that accompany the product. Nonetheless, maintaining synchronization among such entities has proven to be a demanding and complex task. For example, due to cyclical nature of software projects, maintaining synchronization among the project management team, the development team and the documentation team can typically become a futile exercise. Often the specification and the documentation are updated to synchronize with the product, only after the product has been developed—and not during product development.

In particular, during development it is difficult to identify what is the proper version of the specification and/or product requirement that should drive the design process. Accordingly, the teams involved can squander resources to determine a proper documentation state for a project and/or product. Without a proper and unique source for product/documentation identification, confusion and misunderstandings occur that can lead to lost productivity, and poor customer experience.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject innovation facilitates software development projects via employing a synchronization component that enables synchronization among state of a specification, a product and a documentation that are associated with software development. Such synchronization component further includes a differentiator component that can compare state of the specification with the product (e.g., build of a Structured Query Language server) at desired time intervals, and further identify any discrepancies therebetween, (e.g., by employing the specification as the standard). Hence, each team member can update a respective file and/or activity that requires modifications due to the identified discrepancies. In a related aspect, a specification database is provided, wherein a project manager responsible for preparing the specification can enter and/or store the definition of the specification in the specification database, in form of a Structured Query Language (SQL), for example. The specification database can further store definitions of Dynamic Management Views (DMVs), wherein such views expose a state (e.g., a current state) of the SQL server, and contain metadata that is typically not persisted on disk, and stored in memory only. For example, the DMV's can present a view of session information, including the session default execution environment. A report and/or log record can also contain a description of files for state of the database before and after modification of the specification by the project manager, and further include list of members for each team that are affected thereby. As such, a centralized location is created for maintaining updates of the specification and the product, and for enabling synchronization among the specification, the product and the associated documentation.

According to a further aspect of the subject innovation, a specification data entry form component can assist populating the specification database by the project manager. Moreover, the program manager can designate various views (e.g., rows and columns) that define the specification, and employ such views for populating the specification database. Furthermore, an XML (eXtensible Markup Language) generator component can generate relevant schema files from the specification database. Such schema files are uploaded to a documentation repository database that is accessible to the documentation team (e.g., to develop Help files, and the like for customers.)

In accordance with a further aspect of the subject innovation, the differentiator component can operate upon the specification database at predetermined intervals, or as required by the project manager, developer or the documentation team. A report can then be generated that identifies changes performed on the specification as compared to the product, and sent to various members of the design, development and documentation team. In a related aspect, the subject innovation can employ artificial intelligence (AI) components, to facilitate synchronization among the specification, the product and the specification.

According to a methodology of the subject innovation, a specification database can initially receive a set of changes to the specification, from a project manager. Subsequently, the specification database avails itself to the differentiator component for a comparison of the specification to the product, while it is being developed by the developer. Next, a report can be generated and submitted to members of: the project management, development and the documentation team. Based on such report various team members can then update the respective files, (e.g., the developer produce code to satisfy modifications by the project manager to the specification, and the documentation team revise the help files for customer use.)

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 3 illustrates a particular documentation according to an aspect of the subject innovation.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Also, the word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term computer program as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Figure 1:
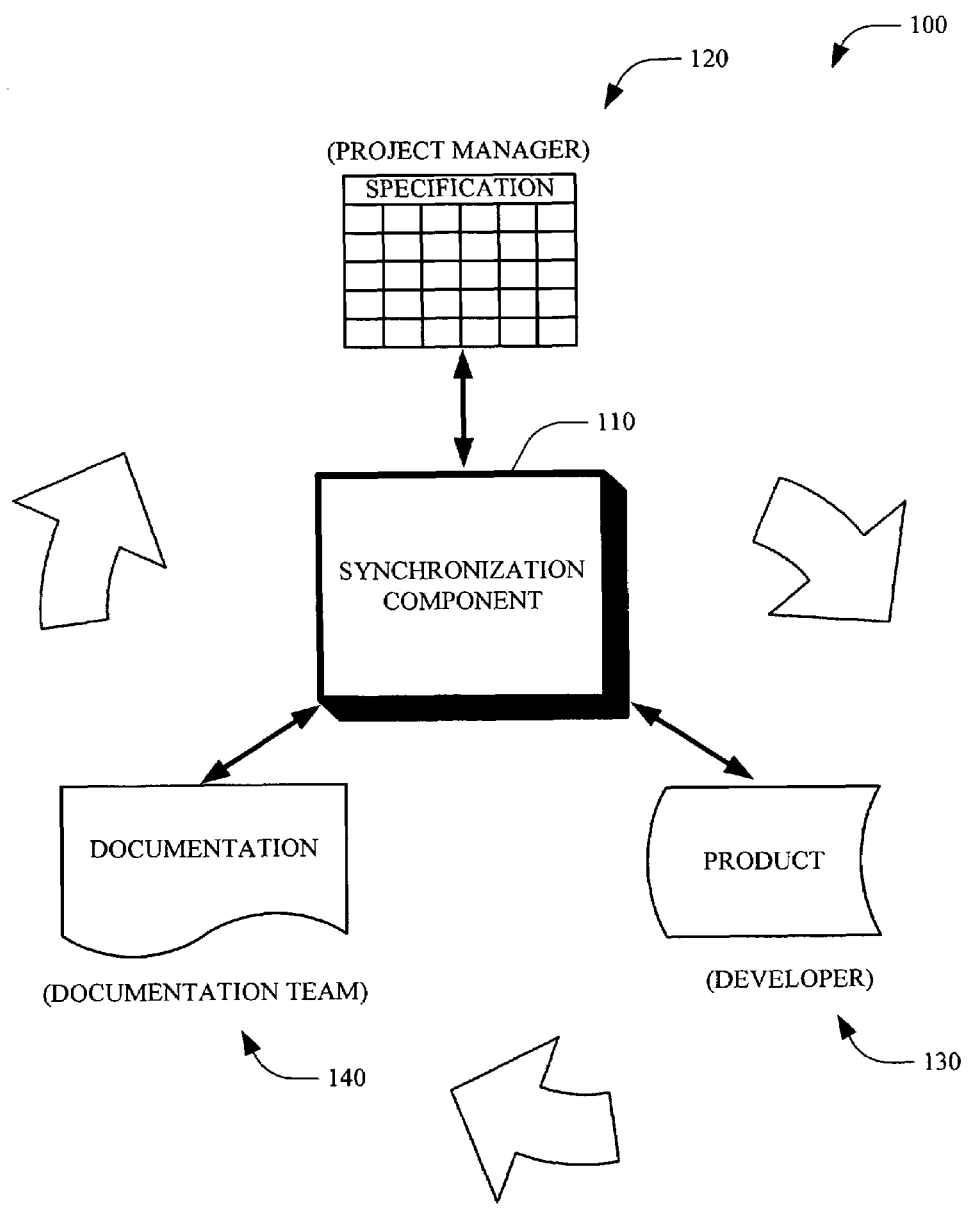
FIG. 1 illustrates a block diagram of a synchronization component as part of a software development environment, in accordance with an aspect of the subject innovation.

Turning initially to FIG. 1, a software development environment 100 is illustrated, wherein a synchronization component 110 can facilitate synchronization among the parties involved, namely: the project manager 120, the developer 130 and the documentation team 140. Typically, the project manager 120 supplies the specification within the software development cycle. In general, the developer 130 is responsible for ensuring that suitable code is implemented to produce requirements of the specification. Likewise, the documentation team 140 supplies the custom help files associated with the product, to the customers. Such documentation can include books on line (BOL), interactive help documents and the like.

As illustrated in FIG. 1, the synchronization component 110 can enable synchronization among a state for a specification, a product and an associated documentation. For example, a state of specification can be employed as an initial standard for the synchronizing component 110, and for comparing the product thereto, as will be described in detail infra. Upon such synchronization supplied among the various participants, a notification can be provided to members in the project management, development and the documentation team, for example.

Figure 2:
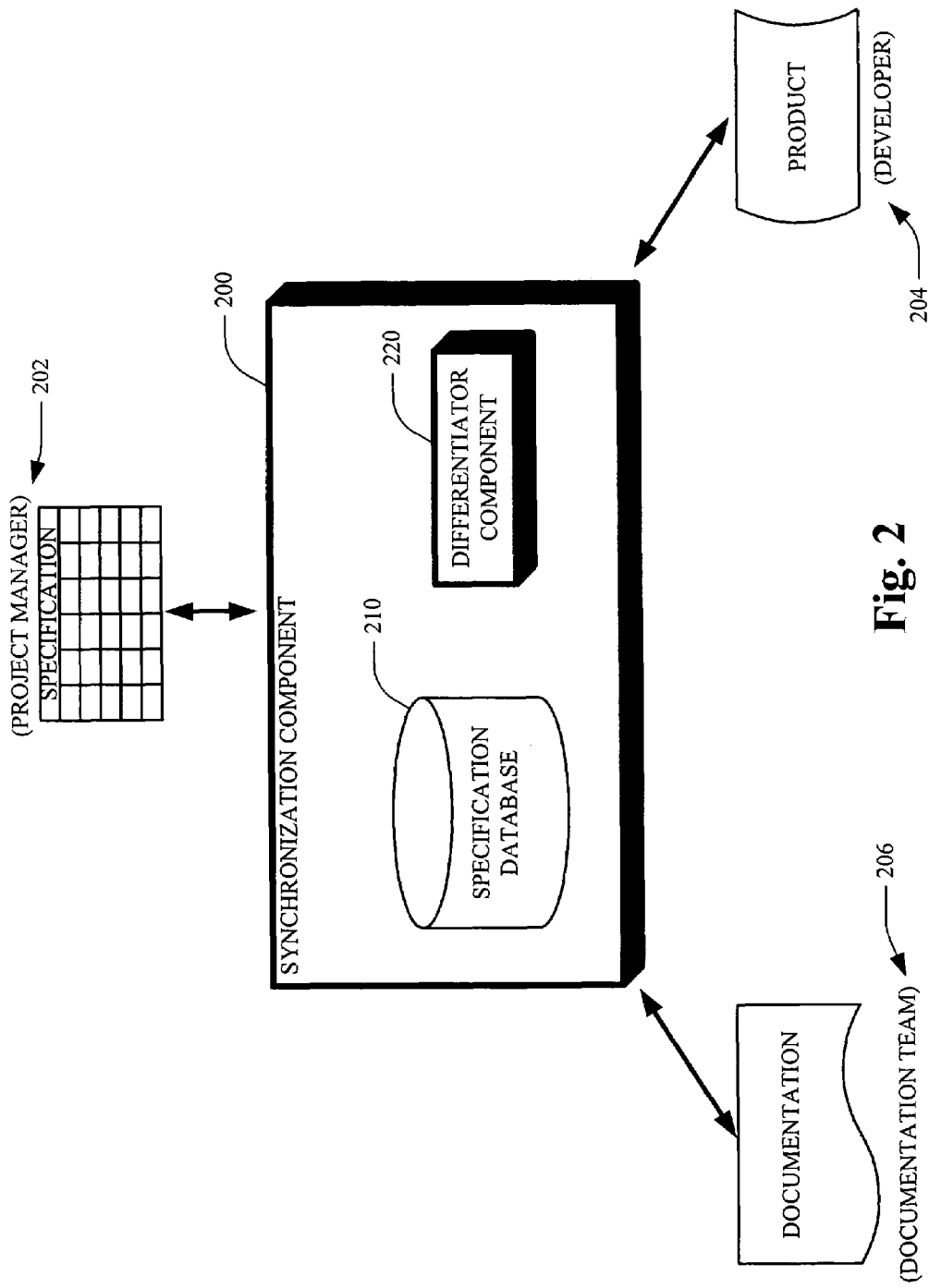
FIG. 2 illustrates a block diagram of a synchronization component in accordance with a particular aspect of the subject innovation.

FIG. 2 illustrates a block diagram of a synchronization component in accordance with a particular aspect of the subject innovation. The synchronization component 200 includes a specification database 210, and a differentiator component 220. The specification database 210 can be in form of relational database(s) that stores massive amounts data, which can further be accessed, retrieved, or otherwise manipulated programmatically. Such design database can further store definitions of Dynamic Management Views (DMVs), wherein such views expose a state (e.g., a current state) of the SQL server, and contain metadata that is typically not persisted on disk and stored in memory only. For example, such DMV's can present a view of session information, including the session default execution environment.

In general, relational database(s) store data in tables, wherein each table in such database can be uniquely identified by its name, for example. Furthermore, each table can contain a multitude of columns and rows. Each column has a name and data type associated with it, while rows are records of column information. Queries for such tables can be constructed in accordance to a standard query language (e.g., structured query language (SQL)), to access content of a table in the database. For example, in order for queries to be executed against SQL tables, information representing the tables typically exist in a form such that a compiler can reference the information at compile time. Such relational query expression select can include support for projection, filtering, sorting, grouping and joining operations.

The select statement can be employed to query against SQL specific types in the specification database 210. For example, such types can represent the SQL database schema, wherein for each table or view declared in a database, a structural type can exists that describes column metadata. Each of these types is known as a tuple type or row. In general, tuple types are information utilized to describe a single row of data from a table with a matching schema. Moreover, a linkage between a plurality of tables can be defined via SQL data definition statements (DDL) in accordance with implementations of a relational item store. The specification data base 210 can itself comprise a plurality of other distributed storage medium units and configurations.

As illustrated in FIG. 2, the specification database 210 is operatively connected to, and accessible by a differentiator component 220, which can compare state of the specification with the product at any instance, to identify any discrepancies therebetween, (e.g., by employing the specification as the standard). In a related aspect, the differentiator component 220 can initially access content of the specification database 210, having an object hierarchy for example.

The object and its properties can be further broken down into segments that are stored into different data records and other distributed database configurations (not shown). Each of the data records can store the same number of bytes with logical elements stored in multiple data records. Accordingly, there can be different record types. For example, there can exist records that contain object information (object records); records that contain property attributes (property records); records that contain information related to the association of partitions and replicas, (partition records), and the like. Also, objects can be stored as a "blob," or raw piece of data, for faster retrieval and storage. The differentiator component 220 can compare contents of various records for the specification database 210 with that of the product (e.g., SQL server product built), and determine a difference of content therebetween. Updated information related to modifications performed on the specification database 210 can then be transmitted to other team members (e.g., members of the developer team 204 that are affected by such modifications). Accordingly, a consistency of transaction can be maintained after modifications to the specification, and the project manager 202, the developer 204 and the documentation team 206 do not observe inconsistencies in their view of the final product requirements. Thus, each party can update and synchronize associated tasks and files according to the modified state of the specification database. In addition, a customized view of the specification database 210 can be provided to the developer 204 and documentation team 206. Such view can be customized based on version, computer configuration, user's preference and/or other suitable information.

FIG. 3 illustrates a particular documentation 300 according to an aspect of the subject innovation. The particular transaction "sys.dm_tran_active_transactions" 305 returns information about transactions for the SQL server instance, and includes a structured content that can be readily stored in a database, such as a specification database. For example, names can be stored in one table, and column names 310 can be stored in another table. Data types 320 can store a number, text, or date value and the like, with the description indicated as 330. A total of twelve rows and three columns exist that indicate total of thirty-six variables, each of which can accept modification that needs to be properly communicated among team members. Such variables can be modified by the program manager during the development of the product, and the subject innovation supplies a central specification database that can apprise the developer and the documentation team of any changes by the program manager. As such proper communication can be maintained among the program manager, developer and the documentation team, wherein a centralized location is provided for maintaining the specification and a comparison thereof with the product. Such can further enable synchronization among various team members. The differentiation component can then operate upon the specification database and provide a common framework for collaborative interactions of the project manager, the developer and the documentation team.

Figure 4:
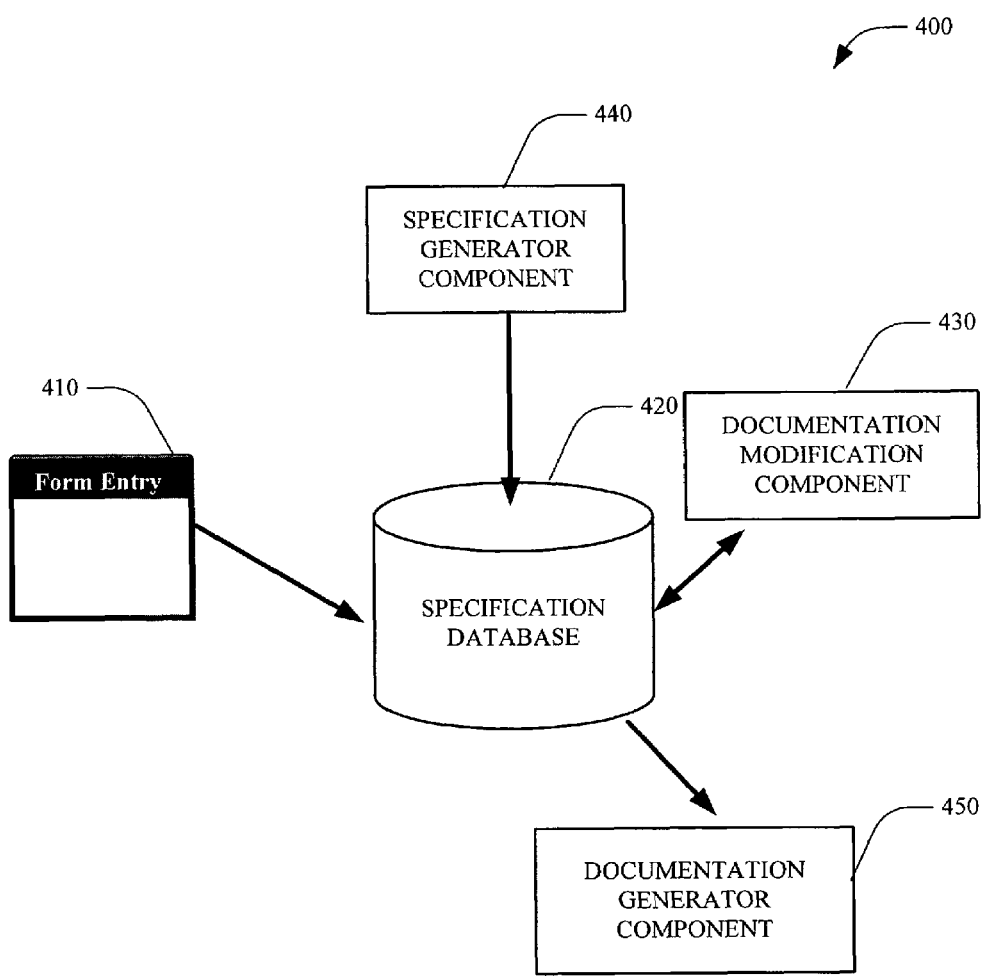
FIG. 4 illustrates system architecture for synchronization in accordance with an aspect of the subject innovation.

FIG. 4 illustrates a particular system architecture 400 for synchronization in accordance with an aspect of the subject innovation. A specification data entry form component 410 enables a user to populate the specification database 420 with names of the Dynamic Management View (DMV), and supply associated data types and columns. Moreover, a documentation modification component 430 can provide modifications to the descriptions that are supplied by the project manager to a writing process during software development, as described in detail infra. As illustrated, the system architecture 400 can further include a specification generator component 440 that can generate standalone compiled help files from the specification database 420, for internal use by the development team, for example. A documentation generator component 450 can supply the documentation files for the built product. The differentiator component (not shown) can compare contents of various records for the specification database 420 with that of the product (e.g., SQL server product built), and can further determine a difference of content therebetween. A log record can also contain a description of the files for state of the specification database 420 before and after modification of the specification by the project manager, and list of members for each team that can be affected thereby.

Figure 5:
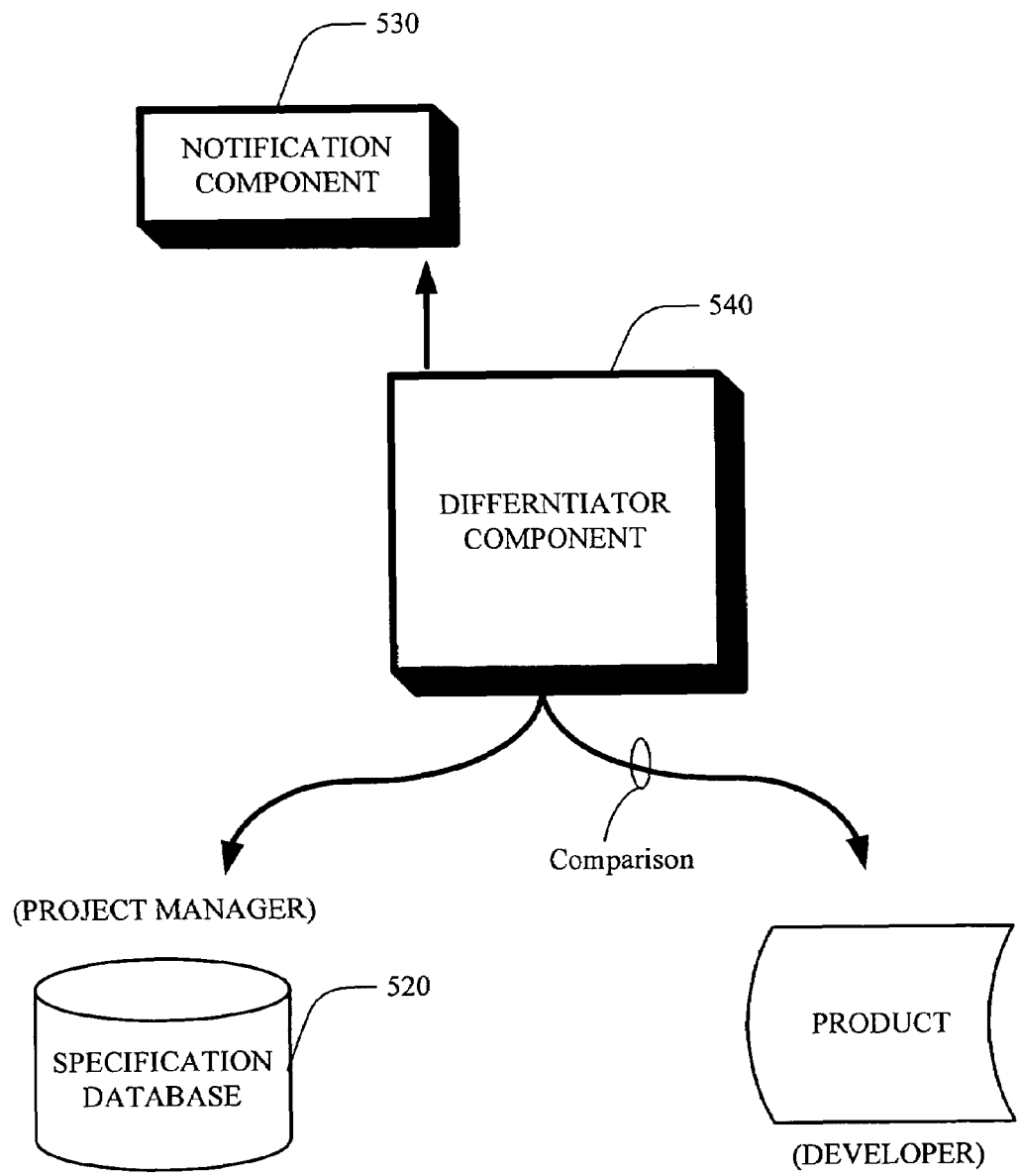
FIG. 5 illustrates a notification component that can supply a visual and/or audible notification of members of software development team, upon modifications to the specification as stored in the specification database.

It is to be appreciated that the differentiator component can run and operate upon the specification database 420 at predetermined intervals, or as required by the project manager, developer or the documentation team. A report can then be generated that identifies changes performed on the specification as compared to the product, and sent to various members of the design, development and documentation team. FIG. 5 illustrates a notification component 530 that can supply a visual and/or audible notification of members of the software development, upon modifications to the specification as stored in the specification database 520. The notification component 530 can send a message (e.g., e-mail, fax, voice message, pager, and the like) to members of the development and documentation team to notify such members of a change to the specification, as identified by the differentiator component 540. Accordingly, a centralized location is provided for notification and comparison of the specification and the product, and for enabling synchronization among the specification, the product and the associated documentation.

In a related aspect, artificial intelligence (AI) components can be employed to facilitate synchronization among the specification, the product and the specification. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
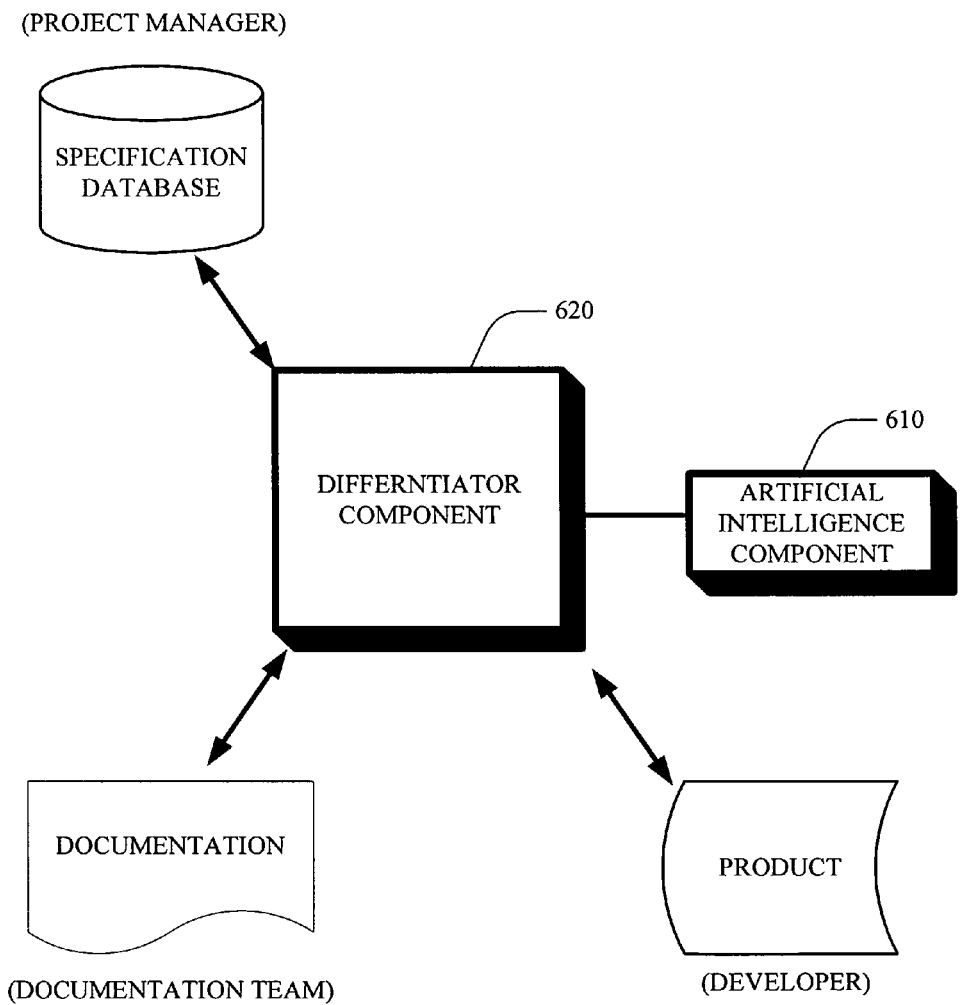
FIG. 6 illustrates an artificial intelligence component that can interact with the differentiator component, to facilitate synchronization among the project manager, the developer and the documentation team in accordance with an aspect of the subject innovation.

FIG. 6 illustrates an artificial intelligence component 610 that can interact with the differentiator component to facilitate synchronization among the project manager, the developer and the documentation team in accordance with an aspect of the subject innovation. For example, a process for determining when and whom to notify upon a discrepancy identified by the differentiator component 620 can be facilitated via an automatic classifier system and process. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 7:
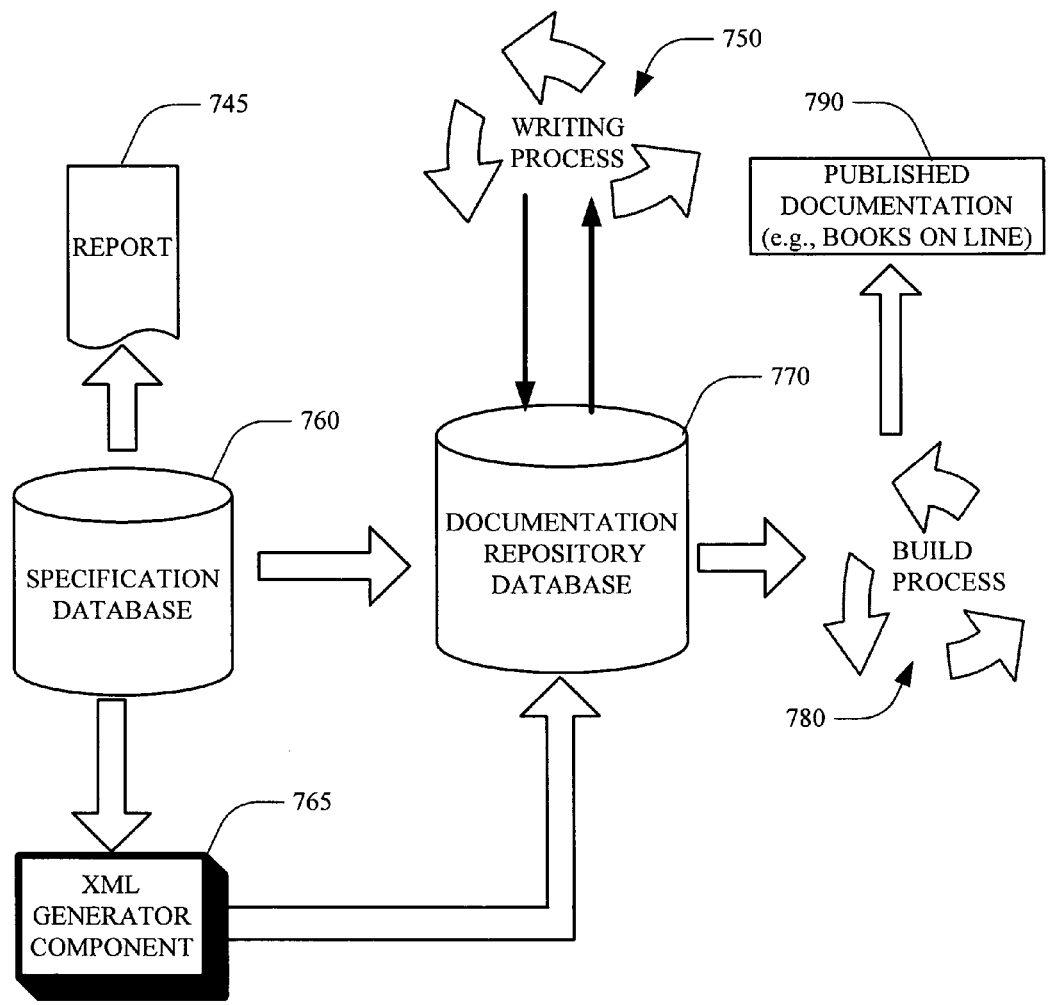
FIG. 7 illustrates a further exemplary block diagram of a synchronization system in accordance with an aspect of the subject innovation.

FIG. 7 illustrates a further exemplary block diagram of a synchronization system in accordance with an aspect of the subject innovation. An XML generator component 765 is operatively connected the specification database 760, to generate XML files from content of the specification database. Typically, the XML can define and describe a class of XML documents using schema constructs of an XML schema language. These schema constructs can be used to constrain and document the meaning, usage, and relationships of data types, elements and their content, attributes and their values, entities, contents and notations, as used in XML documents. Moreover, a managed class of application programming interfaces (API) can be provided to support data transformations from data structure such as SQL of the specification database 760, into XML files employed by a writing process 750 of the documentation team. In addition, the managed class and APIs facilitate operations between disparate object systems such as between managed and unmanaged object systems via interface support of a wrapper and associated marshalling technologies to bridge communications between such systems.

A documentation repository database 770 can act as a repository for all the documentation files, to store converted XML and WordML files. As such, raw data can be transferred from the specification database 760 to the documentation repository database 770. Based on modifications performed earlier on the specification database 760, a writer can then check a file associated with such modification, and respectively modify contents for code of the product. Modifications to the file can then be uploaded to the documentation repository database 770.

Moreover, an editor can subsequently access such modified file in the documentation repository database 770, for editing and checking. A build process 780 can take over and extract XML files, to create books on line 790. In addition, a report file 745 can also be generated to include a log record that contains a description of the files for the specification database 760 and the documentation file database, before and after modification of the specification by the project manager and/or product or codes by the developer. Moreover, list of members of each team that are affected by the modifications can be included in the report. As such, a centralized location is provided for comparison of the specification and the product, and for enabling synchronization among the specification, the product and the associated documentation.

Figure 8:
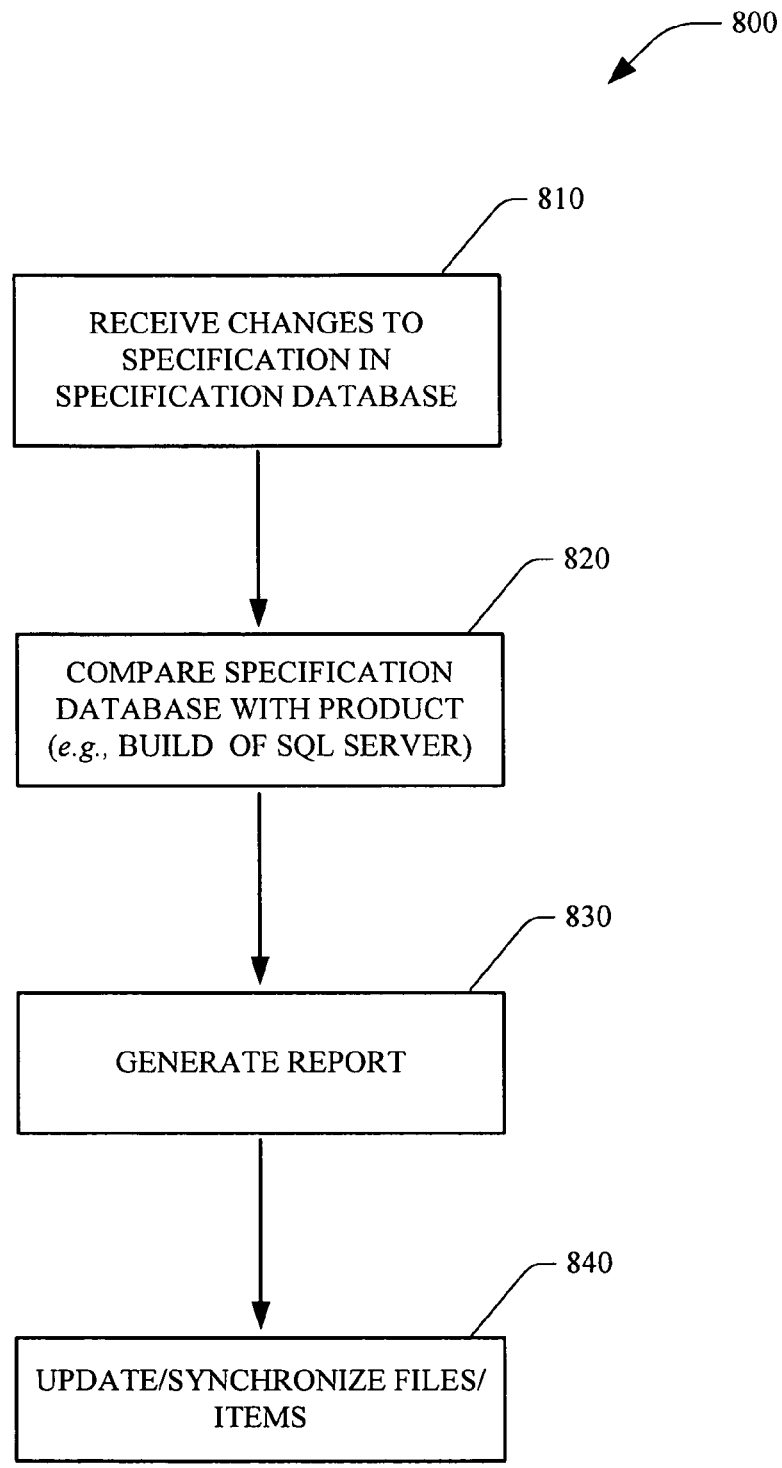
FIG. 8 illustrates a methodology of synchronization among a specification, product and documentation in accordance with an exemplary aspect of the subject innovation.

FIG. 8 illustrates a methodology 800 of synchronization among a specification, product and documentation in accordance with an exemplary aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and 810 a specification database can initially receive a set of changes to the specification, from a project manager, for example. Subsequently and at 820, the specification database avails itself to the differentiator component for a comparison of the specification to the product as being developed by the developer. At 830, a report can be generated and submitted to members of: the project management, development and the documentation team. Based on such report various team members can then update and synchronize the respective files, (e.g., the developer produce code to satisfy modifications by the project manager to the specification), at 840.

Figure 9:
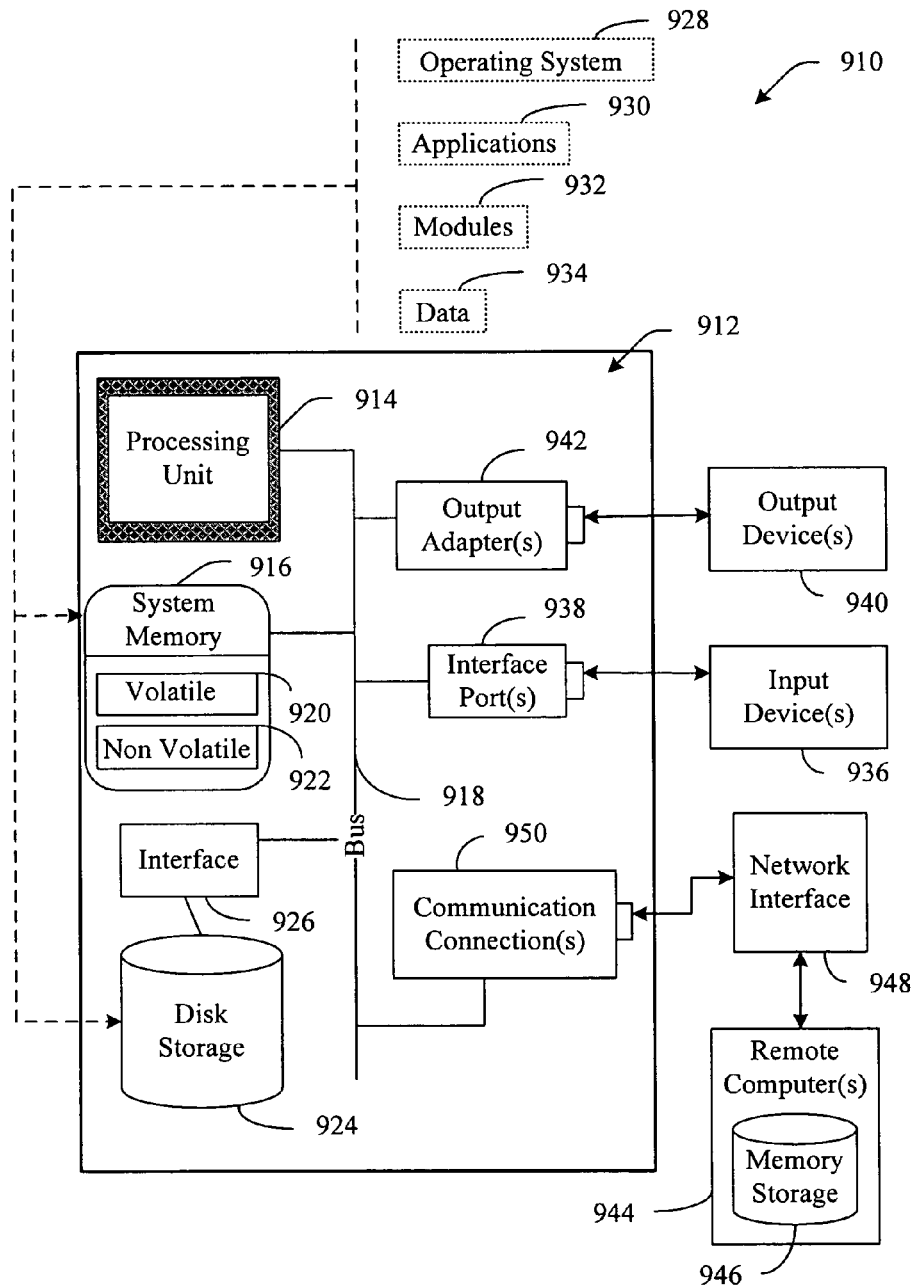
FIG. 9 illustrates an exemplary environment for implementing various aspects of the subject innovation.
Figure 10:
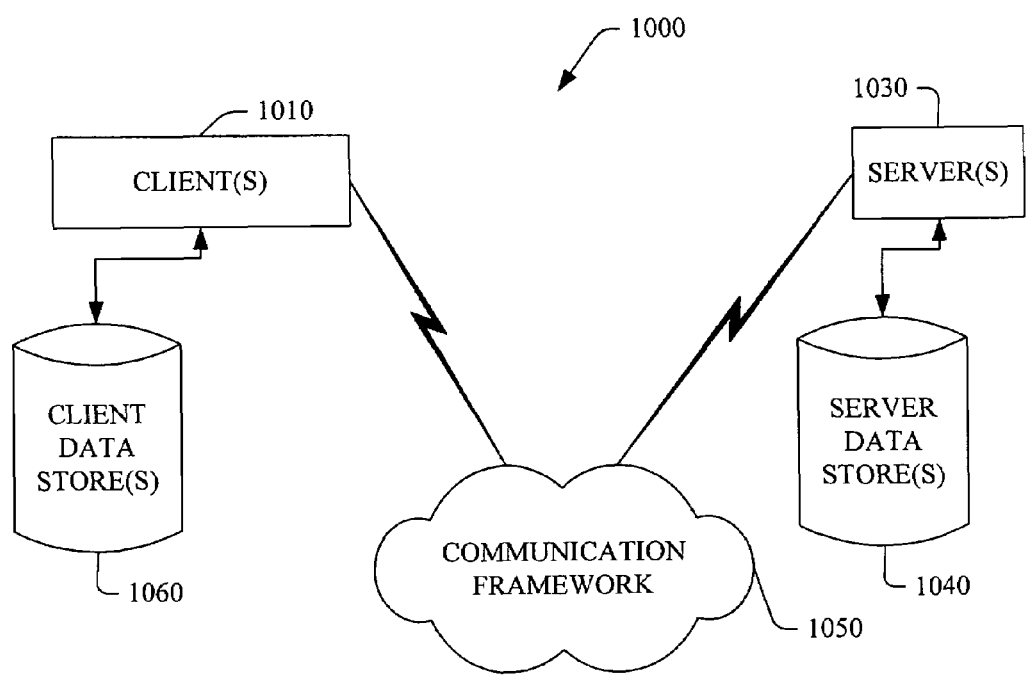
FIG. 10 is a schematic block diagram of an additional-computing environment that can be employed to implement aspects of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed to implement synchronization among a project manager, a development team and a documentation team in accordance with an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:
    a synchronization component that enables synchronization among a software product comprising a build of a Structured Query Language (SQL) server, a specification that defines software design requirements for the build of the SQL server, and a documentation associated with software development, wherein the build of the SQL server comprises a software product that implements SQL server database queries;
    a Structured Query Language (SQL) database configured to store the specification that defines the software design requirements for the build of the SQL server;
    a differentiator component configured to, at predetermined intervals, automatically compare the software design requirements defined by the specification that is stored in the SQL database with the build of the SQL server and, via the automatic comparison, automatically identify discrepancies between the software design requirements and the build of the SQL server;
    a specification data entry form component that enables population or modification of the specification in the SQL database;
    a notification component that automatically notifies a software development team of the discrepancies between the software design requirements and the build of the SQL server that were automatically identified via the automatic comparison of the software design requirements and the build of the SQL server;
    an XML generator component that automatically derives XML files from the software design requirements defined by the specification stored in the SQL database; and
    a documentation component that performs a build process that automatically creates an online help file from the XML files automatically derived from the XML files from the software design requirements.

2. The computer implemented system of claim 1, the differentiator component further contains a log record that contains a description of files for state of the specification database before and after modification of the specification.

3. The computer implemented system of claim 1 further comprising a documentation repository database that stores the documentation.

4. The computer implemented system of claim 1 further comprising a documentation modification component that supplies modifications to a writing process of the software development.

5. The computer implemented system of claim 1 further comprising an artificial intelligence component that facilitates the synchronization.

6. A computer implemented method comprising the following computer executable acts:
    changing a specification stored in a Structured Query Language (SQL) database, the specification defining software design requirements for a software product comprising a build of a Structured Query Language (SQL) server that comprises a software product that implements SQL server database queries;
    according to a predetermined interval, automatically comparing the software design requirements defined by the changed specification that is stored in the SQL database with the build of the SQL server;
    via the automatic comparison, automatically identifying discrepancies between the software design requirements and the build of the SQL server;
    automatically notifying a software development team of the discrepancies between the software design requirements and the build of the SQL server that were automatically identified via the automatic comparison of the software design requirements and the build of the SQL server;
    automatically deriving XML files from the software design requirements defined by the changed specification stored in the SQL database; and
    automatically creating an online help file from the XML files automatically derived from the software design requirements.

7. The computer implemented method of claim 6 further comprising generating a report based on the identifying act.

8. The computer implemented method of claim 6 further comprising updating the software product.

9. The computer implemented method of claim 6 further comprising populating the specification database.

10. A computer readable storage medium having stored thereon computer-executable instructions that, when executed by a processor, perform a method, the method comprising:

changing a specification stored in a Structured Query Language (SQL) database, the specification defining software design requirements for a software product comprising a build of a Structured Query Language (SQL) server that comprises a software product that implements SQL server database queries;

according to a predetermined interval, automatically comparing the software design requirements defined by the changed specification that is stored in the SQL database with the build of the SQL server;

via the automatic comparison, automatically identifying discrepancies between the software design requirements and the build of the SQL server;

automatically notifying a software development team of the discrepancies between the software design requirements and the build of the SQL server that were automatically identified via the automatic comparison of the software design requirements and the build of the SQL server;

automatically deriving XML files from the software design requirements defined by the changed specification stored in the SQL database; and automatically creating an online help file from the XML files automatically derived from the software design requirements.

\* \* \* \* \*